US010307735B2

(12) United States Patent
Kim et al.

(10) Patent No.: US 10,307,735 B2
(45) Date of Patent: Jun. 4, 2019

(54) GD-CONTAINING, ANTI-COKING SOLID ACID CATALYSTS AND PREPARATION METHOD AND USE THEREOF

(71) Applicant: Korea Research Institute of Chemical Technology, Daejeon (KR)

(72) Inventors: Sung Tak Kim, Daejeon (KR); Geun Jae Kwak, Daejeon (KR); Ki Won Jun, Daejeon (KR); Ahron Hwang, Daejeon (KR); Seok Chang Kang, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 0 days.

(21) Appl. No.: 15/649,222

(22) Filed: Jul. 13, 2017

(65) Prior Publication Data

US 2018/0065110 A1   Mar. 8, 2018

(30) Foreign Application Priority Data

Jul. 15, 2016   (KR) .......................... 10-2016-0090285

(51) Int. Cl.
*B01J 29/06*   (2006.01)
*B01J 23/10*   (2006.01)
(Continued)

(52) U.S. Cl.
CPC ............. *B01J 23/10* (2013.01); *B01J 29/061* (2013.01); *B01J 35/006* (2013.01); *B01J 35/10* (2013.01);
(Continued)

(58) Field of Classification Search
CPC . B01J 23/10; B01J 35/00; B01J 35/006; B01J 35/10; B01J 2231/20; B01J 2231/76;
(Continued)

(56) References Cited

U.S. PATENT DOCUMENTS

| 3,436,357 A | * | 4/1969 | Rosinski | .................. B01J 29/08 |
| | | | | 208/120.01 |
| 3,534,114 A | * | 10/1970 | Bushick | ................. B01J 29/084 |
| | | | | 208/120.01 |
| 3,624,173 A | * | 11/1971 | Kirsch | ................... B01J 29/084 |
| | | | | 208/138 |

(Continued)

OTHER PUBLICATIONS

Kucherov, et al. "Catalytic Oxidation of Methane by Nitrous Oxide on H[Al]ZSM-5 Zeolite, Silicalite, and Amorphous $SiO_2$ Modified by Iron, Silber, and Gadolinium Ions" *Kinetics and Catalysis* vol. 43, No. 5, 2002, pp. 711-723. Translated from Kinetika i Kataliz, vol. 43, No. 5, 2002, pp. 761-774.

*Primary Examiner* — Patricia L. Hailey
(74) *Attorney, Agent, or Firm* — Norton Rose Fulbright US LLP

(57) ABSTRACT

The present invention relates to an anti-coking catalyst having a physical property of reducing coke formation, which comprises a solid acid catalyst containing gadolinium (Gd) on the surface, a preparation method thereof, and a use thereof. The preparation method includes a first step of determining the amount of gadolinium (Gd) or a Gd-providing precursor to be used relative to the total weight of the solid acid catalyst, which reducing the coking of a specific solid acid catalyst below a specific level under a specific reaction condition; and a second step of preparing a Gd-containing solid acid catalyst using the amount determined in the first step. The catalyst according to the present invention is a catalyst in which an appropriate weight ratio of gadolinium is supported on the surface of a pure solid acid substance or solid acid substance on which a specific metal is supported. Therefore, the production of coke on the catalyst surface is inhibited while maintaining the activity of the solid acid catalyst in a hydrocarbon conversion reaction, and as a result, the catalyst of the present invention exhibits an effect of improving its lifespan.

19 Claims, 7 Drawing Sheets

(51) Int. Cl.
*B01J 35/00* (2006.01)
*B01J 35/10* (2006.01)
*C10G 11/05* (2006.01)

(52) U.S. Cl.
CPC .......... *C10G 11/05* (2013.01); *B01J 2229/38* (2013.01); *B01J 2231/20* (2013.01); *B01J 2231/76* (2013.01); *B01J 2523/375* (2013.01); *C10G 2300/708* (2013.01); *Y02P 30/42* (2015.11)

(58) Field of Classification Search
CPC  B01J 2523/375; B01J 29/061; B01J 29/7049; B01J 29/405; C10G 2300/708
USPC .................................... 502/1, 73, 302, 303
See application file for complete search history.

(56) References Cited

U.S. PATENT DOCUMENTS

| | | | | |
|---|---|---|---|---|
| 3,764,516 | A * | 10/1973 | Steinmetz | C10G 47/16 208/111.01 |
| 3,770,845 | A * | 11/1973 | Hirschler | B01J 29/18 208/138 |
| 4,300,015 | A * | 11/1981 | Kirsch | B01J 20/186 502/73 |
| 5,122,363 | A * | 6/1992 | Balkus, Jr. | A61K 49/1893 424/684 |
| 7,015,175 | B2 * | 3/2006 | Vassilakis | B01J 23/63 502/217 |
| 9,115,047 | B2 * | 8/2015 | Hattori | C07C 211/46 |
| 2004/0149628 | A1 * | 8/2004 | Ou | B01J 23/002 208/108 |

* cited by examiner

GD-CONTAINING, ANTI-COKING SOLID ACID CATALYSTS AND PREPARATION METHOD AND USE THEREOF

TECHNICAL FIELD

The present invention relates to an anti-coking catalyst having a physical property of reducing coke formation comprising a Gd-containing solid acid catalyst which contains gadolinium (Gd) on the surface, and a preparation method and use thereof.

BACKGROUND ART

Since zeolite-based solid acid catalyst has high-density acid sites on its surface and can structurally control the selectivity, it has been used as a naphtha cracking catalyst since the 1950s and is now widely used as cracking catalyst in the petrochemical industry. In addition, due to its chemical and physical properties, it is also widely used for hydrocarbon conversion and production-related reactions, i.e., a reaction of converting syngas comprised of hydrogen and carbon monoxide to light olefins and BTEX; a reaction of converting methanol to light olefins and gasoline; a reaction of reforming methane to syngas; a cracking reaction of ethane; an oligomerization reaction of light hydrocarbons, such as ethane, ethylene, propane, propylene, etc.; an isomerization reaction of hydrocarbon compounds; a reaction of converting dimethyl ether to a light olefin and BTEX; an ethylene oligomerization reaction; a reaction of converting methanol to aromatic compounds; a synthesis of monocyclic aromatic compounds or long-chain olefin compounds from syngas; etc.

In particular, the ethylene oligomerization is a reaction where oligomers, i.e., dimers, trimers, etc., are produced from ethylene at the end of the polymerization reaction. Specifically, light hydrocarbons ($C_1$ to $C_5$) and heavy hydrocarbons ($C_6$ or more) can be produced. In addition, $C_6$ to $C_{10}$ aromatic hydrocarbons can be produced through a reaction of converting methanol to monocyclic aromatic compounds. Herein, the aromatic compounds may be aromatic hydrocarbons in which an alkyl group is substituted with hydrogen of benzene. The aromatic compounds, the size of which is enough to be spread and adsorbed in the zeolite pores, may be selected.

Meanwhile, zeolite-based solid acid catalysts can also be used for a process of synthesizing monocyclic aromatic compounds and long-chain olefins from syngas. Syngas is a mixed gas of carbon monoxide and hydrogen, and further, is a raw material that can conceptually synthesize all organic compounds because it contains C, H, and O. Monocyclic aromatic compounds and long-chain olefin compounds can be prepared through a dehydrogenation process using hydrocarbons prepared via the Fischer-Tropsch synthesis while adjusting the proportion of carbon monoxide, carbon dioxide, and hydrogen, which are contained in syngas. Herein, the product thereof may be BTEX, paraffins, and olefins.

Although zeolite-based catalysts have excellent catalytic reactivity in the reactions related to the conversion of carbon resources, carbon deposition (coke) occurs on the surface of the catalysts, which in turn cause inactivation of the catalysts, and as a result, there is a limitation in the commercialization of zeolite-based catalysts. A large amount of acid sites are distributed on the zeolite surface. These acid sites act as active sites for the conversion of hydrocarbons, leading to excellent reactivity of the catalysts, and at the same time, the hydrocarbon intermediates or cations produced during the reaction can easily be adsorbed. The adsorbed hydrocarbon intermediates are grown to carbon compounds containing a large number of aromatic rings through oligomerization, hydrogenation and dehydrogenation, cyclization, aromatization, etc. The grown carbon compounds cover the reaction active sites on the catalyst surface or block the nano-micrometer-sized zeolite pores, thereby to interrupt diffusion of the reactants into the zeolite pores. As a result, the diffusion and contact of the reactants to the surface of the zeolites and the active sites in the pores are intrinsically blocked, and thereby it has a problem in that the zeolite catalysts are inactivated.

In order to reduce the inactivation of the zeolite catalysts due to carbon deposition, various methods have been attempted in synthesizing the catalysts. There is a method of shortening the diffusion path in the zeolite structure and widening the surface area, thereby reducing the inactivation effect of acid sites caused by pore clogging and improving the diffusion of the reactants to the acid sites. For example, there is a method of adjusting zeolite crystals to a nano-micrometer size, a method of de-siliconization by alkali treatment, or a method of assigning a mesoporous structure to zeolites by using a structure directing agent or organic template. In such a case, inactivation of the catalysts due to pore clogging is reduced, and as a result, the lifespan of the catalysts is increased. However, there is a limitation that the increase in the diffusion and surface area due to the adjustment of the zeolite structure does not reduce the rate and amount of carbon deposition.

Another method for reducing the catalyst inactivation caused by coke formation is to reduce the amount of acid sites on the surface of zeolite catalysts, thereby reducing adsorption of hydrocarbon intermediates produced during the reaction to the acid sites. In order to achieve the same, it is required to reduce the amount of aluminum, which is the part where acid sites are expressed, by increasing the ratio of silicon to aluminum during the synthesis of zeolites; to carry out dealumination by post-synthesis treatment; or to reduce acid sites of the zeolite catalysts by ion-exchanging alkali metals. Since the intermediates produced during the conversion of hydrocarbons are adsorbed on the acid sites of the zeolite catalysts and cause inactivation, a relatively small amount of carbon deposition is made in the catalysts with reduced acid sites, and accordingly, the lifespan of the catalysts are increased. However, because the activity of the catalysts is simultaneously decreased due to the reduction of the acid sites, it is difficult to apply the catalysts in the reaction where the acidity of catalysts is required to be high.

DISCLOSURE

Technical Problem

An object of the present invention is to provide an anti-coking catalyst having a physical property of reducing the formation of coke causing the inactivation of the catalyst on the surface of a solid acid catalyst during the conversion reaction of hydrocarbons, while minimizing the reduction of acid sites for maintaining the activity of the solid acid catalyst.

Technical Solution

A first aspect of the present invention is to provide a method of preparing an anti-coking solid acid catalyst having a physical property of reducing coke formation, comprising: a first step of determining the amount of gadolinium (Gd) or Gd-providing precursor to be used relative to the total weight of the solid acid catalyst, which reduces the coking of a specific solid acid catalyst below a specific level under a specific reaction condition in which the catalyst is intended to be used; and a second step of preparing a Gd-containing solid acid catalyst using the amount determined in the first step.

A second aspect of the present invention is to provide an anti-coking catalyst having a physical property of reducing coke formation, comprising a solid acid catalyst containing gadolinium (Gd) on the surface, in which coke intermediates exhibiting a basic property are formed during the reaction selected from the group consisting of ethylene oligomerization reaction, methanol-to-gasoline reaction, hexane cracking reaction, and dehydrogenation reaction of a hydrocarbon formed by Fischer-Tropsch synthesis from syngas.

A third aspect of the present invention is to provide a method of preparing a hydrocarbon by performing ethylene oligomerization reaction, methanol-to-gasoline reaction, hexane cracking reaction, and dehydrogenation reaction of a hydrocarbon formed by Fischer-Tropsch synthesis from syngas, using the catalyst of the second aspect.

Hereinbelow, the present invention will be described in detail.

While designing an anti-coking solid acid catalyst having a physical property of reducing coke formation under various reaction conditions in which hydrocarbons are involved, it was surprisingly found that gadolinium (Gd) can inhibit the coking of the solid acid catalyst without significantly altering the activity of the solid acid catalyst during the reaction (Table 7; Examples 2 and 3; and Comparative Example 2). In addition, it was found that, as the content of gadolinium in the solid acid catalyst increased, weak acid sites increased while strong acid sites decreased. Further, it was also found that since there is no positional shift of the curve, not only is the change in the acid strength insignificant, but the base strength in the solid acid catalyst also becomes stronger and the amount of base sites is increased, and as a result, the adsorption of coke precursors, i.e., carbon cations, to the surface of the solid acid catalyst is inhibited. Therefore, the coking of the solid acid catalyst can be inhibited when the base strength and/or the base density are increased in the solid acid catalyst according to the content of gadolinium. The present invention is based on this finding.

The method of the present invention for preparing an anti-coking solid acid catalyst having a physical property of reducing coke formation includes a first step of determining the amount of gadolinium (Gd) or Gd-providing precursor to be used relative to the total weight of the solid acid catalyst, which reduces the coking of a specific solid acid catalyst below a specific level under a specific reaction condition in which the catalyst is intended to be used; a second step of preparing a Gd-containing solid acid catalyst using the amount determined in the first step; and optionally a third step of determining the supported state of gadolinium in the solid acid catalyst prepared in the second step.

Gadolinium (Gd) is a rare earth element, and has atomic number 64 and an oxidation number of +3. Gd is a silver-white metal having ductility and malleability, wherein it forms a tightly arranged α-structure at room temperature but is converted to a β-structure having a body-centered cubic structure above a certain temperature. Further, Gd exhibits ferromagnetism at 20° C., and also exhibits strong paramagnetism at a temperature higher than 20° C. Furthermore, Gd shows a magnetocaloric effect; that is, the temperature increases when Gd enters into a magnetic field, whereas the temperature decreases when Gd comes out of the magnetic field.

The Gd-containing solid acid catalyst prepared in the second step is characterized in that the number of base sites in the solid acid catalyst is increased by the presence of Gd.

Coke precursors, i.e., olefins or aromatic carbons, formed during the conversion of hydrocarbons are strongly adsorbed, grown, cyclized, and dehydrogenated on the acid sites of zeolite, which is a solid acid catalyst, to grow into coke having a complex aromatic structure. When the amount of weak acid sites on the catalyst surface, especially the amount of strong acid sites, is reduced, the adsorption of the carbon intermediates formed during the conversion of hydrocarbons may be reduced. However, there is a problem in that the activity of the catalyst may also simultaneously be reduced due to the reduction of the acid sites.

The coke precursors formed during the conversion of hydrocarbons contain a shared electron pair, and can thereby act as a Lewis base. Therefore, such materials inherently exhibit a weak basic property. Meanwhile, basicity is increased on the surface of the solid acid catalyst according to the present invention due to the presence of Gd. Accordingly, since coke intermediate materials and the solid acid catalyst of the present invention are all materials with improved basicity, the adsorption therebetween is significantly reduced. As a result, the solid acid catalyst according to the present invention exhibits a tendency that adsorption of the coke intermediate materials is hindered by the addition of gadolinium.

Accordingly, adsorption of coke intermediates, which are formed during the conversion of hydrocarbons, to the surface of the solid acid catalyst is not only physically interfered with by a nano-sized thick film of gadolinium oxide, but also chemically reduced due to the acid-base characteristics of the solid acid surface modified by gadolinium, and as a result, the Gd-supported solid acid catalyst can reduce the inactivation caused by coking.

Therefore, in the Gd-containing solid acid catalyst prepared in the second step, for preventing the adsorption of a coke intermediate physically, chemically by the acid-base characteristic of the catalyst surface, or both physically and chemically, a nano-sized gadolinium or gadolinium oxide-containing film may be formed on the surface of the solid acid catalyst, or $Gd^{3+}$ is ion-exchanged to an acid site of the solid acid catalyst, or may be supported by an electrostatic adsorption method.

In the present invention, the film thickness may be 0.1 nm to 20 nm. When the film thickness is less than 0.1 nm, the gadolinium film cannot physically exhibit the coke-reducing effect, and when the film thickness exceeds 20 nm, the properties as the solid acid catalyst can be remarkably reduced.

The specific reaction condition in the first step includes type of reactions which use a solid acid catalyst, reactant composition therein, space velocity, temperature, pressure, etc.

It is preferred that the specific reaction condition is a condition in which a reaction of forming coke intermediates exhibiting a basic property during the reaction occurs. For example, the reactions may be hydrocarbon conversion and production-related reactions, i.e., a reaction of converting syngas comprised of hydrogen and carbon monoxide to light olefins and BTEX; a reaction of converting methanol to light olefins and gasoline; a reaction of reforming methane to syngas; a cracking reaction of ethane; an oligomerization reaction of light hydrocarbons, such as ethane, ethylene, propane, propylene, etc.; an isomerization reaction of hydrocarbon compounds; a reaction of converting dimethyl ether to a light olefin and BTEX; etc.

A non-limiting example of the specific level described in the first step may be a degree in which the coking is reduced under the same condition as compared to a solid acid catalyst without gadolinium.

In the first step, the amount of gadolinium (Gd) to be used relative to the total weight of a solid acid catalyst may be determined from the temperature-programmed desorption curve of carbon dioxide, base strength, and base site density per gadolinium content.

The Gd-providing precursor may be a precursor generally used in the art, and is not particularly limited. However, the Gd-providing precursor may preferably be gadolinium chloride ($GdCl_3$), gadolinium bromide ($GdBr_3$), gadolinium fluoride ($GdF_3$), gadolinium iodide ($GdI_3$), gadolinium chloride hexahydrate ($GdCl_3 \cdot 6H_2O$), gadolinium nitrate hexahydrate ($Gd(NO_3)_3 \cdot 6H_2O$), gadolinium chloride hydrate ($GdCl_3 \cdot xH_2O$), gadolinium acetate hydrate ($Gd(CH_3CO_2)_3 \cdot xH_2O$), gadolinium sulfate octahydrate ($Gd_2(SO_4)_3 \cdot 8H_2O$), gadolinium oxalate hydrate ($Gd_2(C_2O_4)_3 \cdot xH_2O$), gadolinium sulfate ($Gd_2(SO_4)_3$), gadolinium tris(isopropoxide) ($C_5H_{21}GdO_3$), gadolinium carbonate hydrate ($Gd_2(CO_3)_3 \cdot xH_2O$), gadolinium hydroxide hydrate ($Gd(OH)_3 \cdot xH_2O$), gadolinium boride ($GdB_6$), or a mixture thereof. More preferably, the Gd-providing precursor may be gadolinium nitrate hexahydrate ($Gd(NO_3)_3 \cdot 6H_2O$).

A solid acid is a solid having acidity on its surface, and the presence thereof can be known by the color when an indicator is adsorbed or adsorption of a base. Examples of the proton donor (Brønsted acid) represented by donating $H^+$, which is the source of acidity, include silica, aluminum oxide, hydrogen-form zeolite, etc. In addition, examples of the electron-pair acceptor include anhydrous metal halide, aluminum oxide, sulfuric anhydride, phosphoric anhydride, etc.

As non-limiting examples, the solid acid catalyst may preferably be a zeolite-based material having an inherent crystal form and porosity, or an amorphous material such as silica-alumina complex or silicon-aluminum phosphate; and may be in the form in which at least one of a transition metal, a post-transition metal, and a rare earth metal is supported.

Zeolite is a representative example of a solid acid catalyst, and a zeolite-based solid acid catalyst is widely used as a catalyst because it has structural properties such as the high density of acid sites and porosity, which are present on the surface of a catalyst. In this regard, a zeolite-based solid acid catalyst exhibits excellent chemical and physical properties, and as a result, the catalytic activity thereof is superior.

Zeolite collectively refers to crystalline aluminosilicate.

The zeolite backbone is composed of tetrahedral units formed by $[SiO_4]^{4-}$ and $[AlO_4]^{5-}$, which are bridged by oxygen atoms. Since the Al of $[AlO_4]^{5-}$ has a formal charge of +3, whereas the Si of $[SiO_4]^{4-}$ has a formal charge of +4, each Al has one negative charge. Accordingly, cations are present for charge balancing. The cations are present not in the backbone but in the pores and the remaining space is usually occupied by hydroxyl groups.

The zeolite may be hydrogen- or ammonium-form zeolite Y, zeolite L, zeolite X, mordenite, ZSM, beta, MCM, SSZ, KIT, ferrierite, SL-1F, Si-BEA, SL-1, ZSM-5, MTW, silica MTW, silica-DDR, high silica DDR (ZSM-58, Si/Al=190), silica SSZ-73, allsilicaclathrasil DD3R, silica ferrierite, silica TON, silica LTA, silica ITQ-1, silica ITQ-2, silica ITQ-3, silical TQ-4, silica ITQ-7, silica ITQ-29, silica ITQ-32, a silica zeolite having CHA, STT, ITW, or SVR topology, silica FAU, silica AST, a silica zeolite YNU-2 having MSE topology, silica RUB-41, silica ZSM-22, silica MEL, a zeolite analogue having a Si/Al ratio of 15 or greater, or a mixture thereof. More preferably, the zeolite may be hydrogen- or ammonium-form zeolite Y, zeolite L, zeolite X, mordenite, ZSM, beta, MCM, SSZ, KIT, or ferrierite.

The zeolite may have a mesopore structure or a hierarchical structure in addition to a nanopore structure. Additionally, the zeolite may have regular pores or channels.

Accordingly, non-limiting examples of the Gd-containing solid acid catalyst according to the present invention may be represented by the following Formula 1.

Formula 1:

wherein, in the above Formula, Gd is a gadolinium metal; M is a metal selected from a transition metal, a post-transition metal, and a rare earth metal; and A is hydrogen- or ammonium-type hydrophobic zeolite, or a amorphous solid acid material.

In particular, x, y, and z are the values which can be obtained when A is contained at 1 part by weight and the gadolinium metal (Gd) is contained at 0.001 parts by weight to 0.5 parts by weight, preferably 0.005 parts by weight to 0.3 parts by weight, and the metal (M) is contained at 0 parts by weight to 0.5 parts by weight.

The content of gadolinium in the Gd-containing solid acid catalyst according to the present invention may be 0.001 parts by weight to 0.5 parts by weight relative to the solid acid. In the compound of Formula 1, the weight ratio (x/z) of gadolinium relative to the pure solid acid material (A) may be 0.001 to 0.5, preferably 0.005 to 0.3. When x/z is less than 0.001, the change in the chemical properties of the catalyst, such as acidity and basicity of the catalyst, are insignificant, and thus an effect of inhibiting coke formation is not exhibited. In addition, when x/z is 0.5 or greater, the change in the chemical properties of the catalyst is large, which may lead to decrease in the yield of a target product.

The contents of the transition metal, the post-transition metal, and/or the rare earth metal (M) in the Gd-containing solid acid catalyst according to the present invention may have a weight ratio of 0 to 0.5 relative to the solid acid, preferably a weight ratio of 0.001 to 0.03. In the compound of Formula 1, the weight ratio (y/z) of the single metal (M) relative to the pure solid metal (A) may be 0.001 to 0.5, more preferably 0.005 to 0.3. In particular, when y/z is less than 0.001, the effect of the metal as a reaction sensitizer is insignificant, and when y/z exceeds 0.5 or more, the characteristics as a solid acid catalyst in the reaction may be markedly reduced.

In the present invention, the gadolinium or the gadolinium precursor may be provided in a solid acid by any one method of an impregnation method, an ion-exchange method, and an electrostatic adsorption method.

In one exemplary embodiment, the Gd-containing, anti-coking solid acid catalyst may be provided by a preparation method, comprising:

Step A of preparing an aqueous solution containing gadolinium or a precursor thereof;

Step B of mixing the aqueous solution with a solid acid;

Step C of separating, washing, and drying the catalyst obtained from Step B; and Step D of calcining the catalyst obtained from Step C in a temperature range of 350° C. to 750° C. for 1 hour to 48 hours.

In Step B, any one or more of a transition metal, a post-transition metal, or a rare earth metal may be further mixed. Depending on the type of a metal supported on the pure solid acid material, the catalyst exhibits an effect of enhancing the yield of a specific compound by selectively adjusting the conversion reaction of carbons. For example, an isomerization, a hydrogenation-dehydrogenation, or a reaction of adding oxygen may selectively occur due to the effect of the metal.

In the preparation of the solid acid catalyst provided in the present invention, when two types of metals including gadolinium are supported on a solid acid support (when the value of y in Formula 1 is greater than 0), the two metals may be supported in the following order. The catalyst may be prepared through the steps of washing, drying, and calcining two types of the metals after simultaneously supporting these two metals (a) when the gadolinium-solid acid catalyst is prepared by the above-described supporting method, and then one of a transition metal, a post-transition metal, and a rare earth metal is additionally supported; (b) when one of a transition metal, a post-transition metal, and a rare earth metal is prepared on the solid acid support by the above-described supporting method, and then gadolinium is supported; or (c) when the solid acid support is added to an aqueous solution in which the gadolinium precursor is dissolved together with one of a transition metal precursor, a post-transition metal precursor, and a rare earth metal precursor in deionized water.

Step B may be carried out by any one or more methods of impregnation, ion-exchange, or electrostatic adsorption.

The aqueous solution of Step B may further include at least one of a transition metal, a post-transition metal, or a rare earth metal. In Step B where gadolinium is supported on a solid acid material, when there is no additional support of other metals (when the value of y in Formula 1 is 0), an amorphous solid acid material having an acidity or a hydrogen- or ammonium-type material, is mixed in the aqueous solution in which the gadolinium precursor is dissolved in deionized water, so as to form a slurry. The amount and pH of the aqueous solution used may vary depending on the supporting method.

In the impregnation method, an aqueous solution of the gadolinium precursor in an amount of 1 to 5 times the volume of the pore volume of a solid acid material is added to the solid acid material, so that the deionized water can be evaporated under reduced pressure or at temperatures ranging from 50° C. to 100° C.

In the ion-exchange method, a solid acid material is added to an aqueous solution of the gadolinium precursor in a molar concentration of 0.001 M to 5 M, and the mixture is stirred at temperatures ranging from room temperature to 90° C. for 1 hour to 72 hours in order to induce ion exchange between the cation on the surface of the solid acid catalyst and the cation of the gadolinium precursor. Herein, an aqueous solution (5 mL to 100 mL) of the gadolinium precursor per solid acid material (1 g) is mixed, and then the ion exchange above is repeated one to three times so that sufficient ion exchange between two cations is carried out.

In the electrostatic adsorption method, the pH of an aqueous solution of the gadolinium precursor is adjusted according to the point of zero charge of a solid acid material and the charge of the gadolinium precursor. For example, when the point of zero charge of the solid acid material is pH 3 and the charge of the gadolinium precursor in an aqueous solution is positive, the pH of the aqueous solution is adjusted to pH 4 to pH 11, which is greater than pH 3. On the contrary, when the point zero charge of the solid acid material is pH 8 and the charge of the gadolinium precursor is negative, the pH of the aqueous solution is adjusted to pH 7 to pH 2, which is less than pH 8.

In Step C where gadolinium is supported on a solid acid material, the obtained slurry of the solid acid catalyst is repeatedly washed by methods such as filtration and centrifugation using deionized water. The drying and calcination of the solid acid catalyst obtained after the washing can be carried out by a method generally known in the art. As a preferred example, the catalyst slurry is dried at a temperature range of 0° C. to 150° C. in an air or nitrogen atmosphere for 1 hour to 72 hours.

In Step D where gadolinium is supported on a solid acid material, the solid acid catalyst dried by the methods above is calcined at a temperature range of 350° C. to 750° C. in an air or nitrogen atmosphere for 1 hour to 48 hours. When the calcination temperature is less than 350° C., it may not be sufficient to burn off the precursor salt in the catalyst or to restore the acid site in the catalyst. In addition, when the calcination temperature exceeds 750° C., the specific surface area, pore volume, crystallinity, and density of the acid and base of the catalyst may be reduced due to the structural collapse of the zeolite catalyst and the increase of the sizes of the metal particles.

Advantageous Effects

The catalyst according to the present invention is a catalyst in which an appropriate weight ratio of gadolinium is supported on the surface of a pure solid acid material or a solid acid material on which a specific metal is supported. Therefore, the formation of coke on the catalyst surface is inhibited while maintaining the activity of the solid acid catalyst in a hydrocarbon conversion, and as a result, the catalyst of the present invention exhibits an effect of improving its lifespan.

BRIEF DESCRIPTIONS OF THE DRAWINGS

Figure 5:
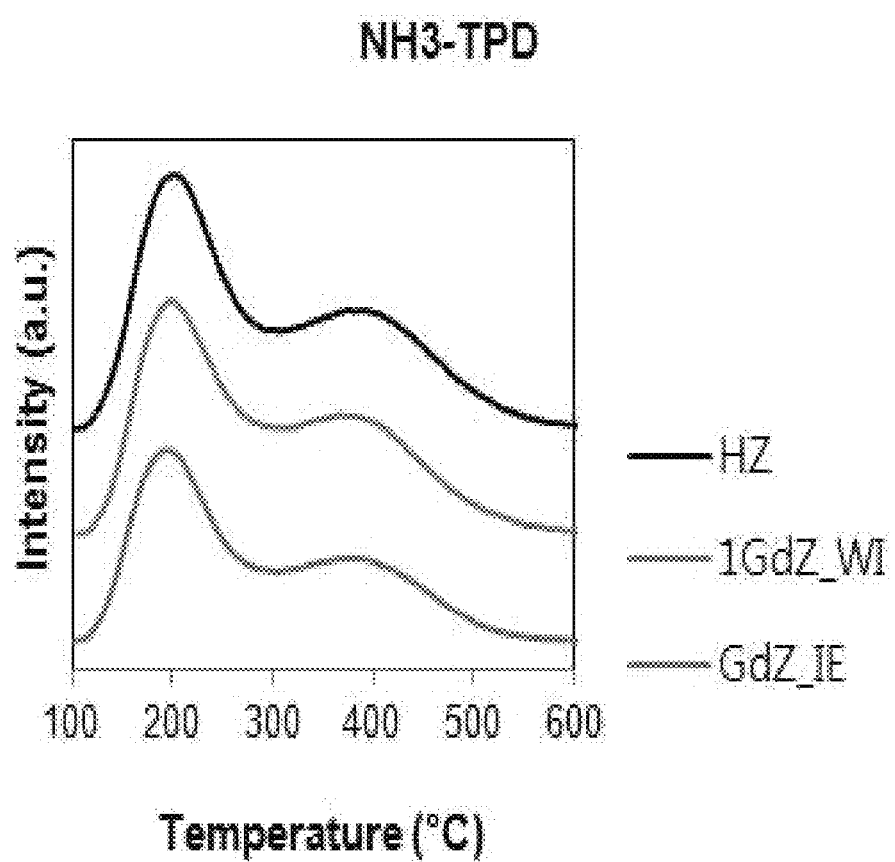
Figure 6:
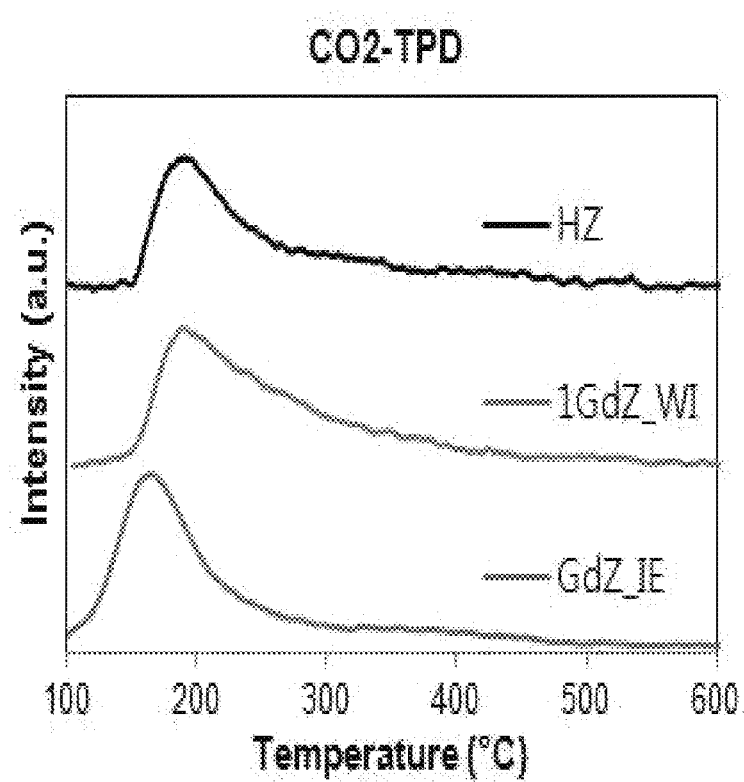

FIG. 5 is a graph showing the temperature-programmed desorption curve of ammonia in the catalyst, in which coke formation is inhibited, prepared according to the ion-exchange and impregnation methods FIG. 6 is a graph showing the temperature-programmed desorption curve of carbon dioxide in the catalyst, in which coke formation is inhibited, prepared according to the ion-exchange and impregnation methods.

Figure 7:
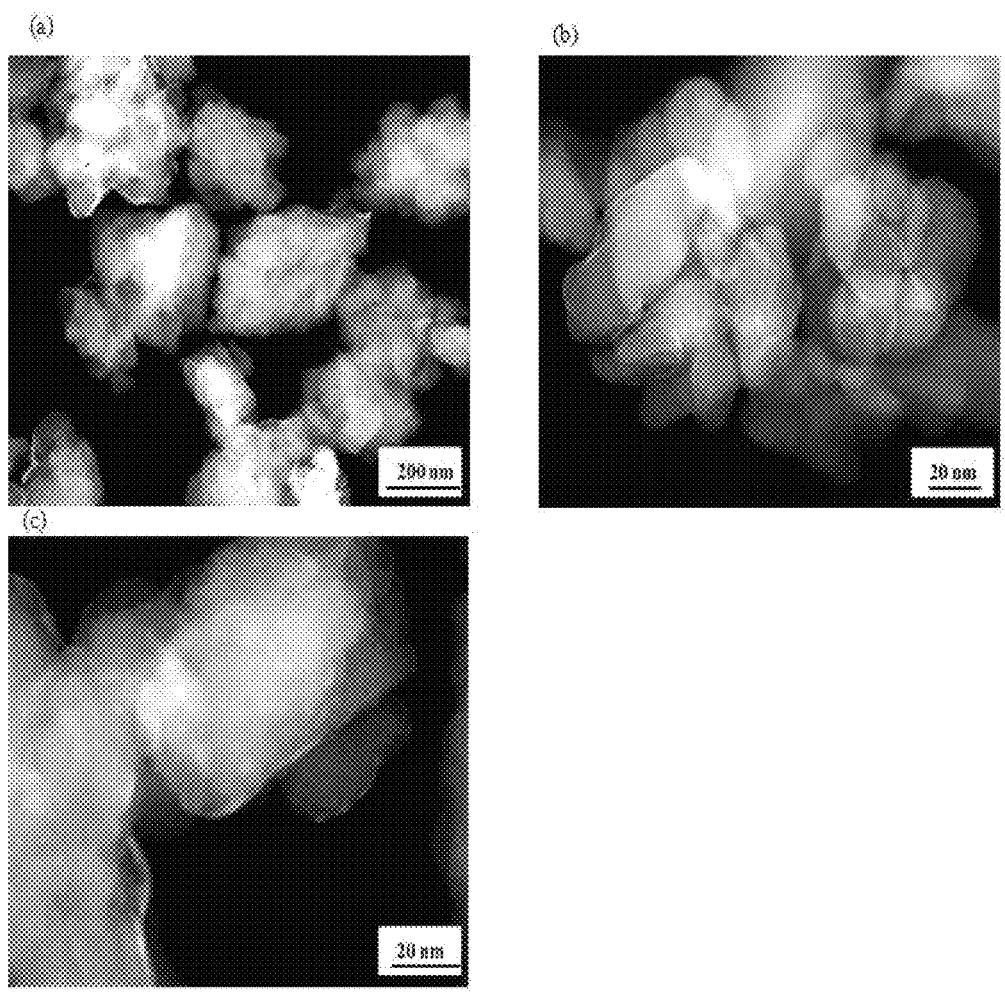

FIG. 7 is high angle annular dark-field (HAADF) STEM images showing the catalyst, in which coke formation is inhibited, prepared according to the electrostatic adsorption method.

DETAILED DESCRIPTION OF THE EMBODIMENT

Hereinbelow, the present invention will be described in detail with accompanying exemplary embodiments. However, the exemplary embodiments disclosed herein are only for illustrative purposes and should not be construed as limiting the scope of the present invention.

Comparative Example 1

Catalyst (HZSM-5, Si/Al=25)

In order to covert ammonium ($NH_4$)-type ZSM-5 zeolite (Zeolyst; CBV5524, Si/Al=25) into hydrogen (H)-type ZSM-5, the zeolite was calcined in an air atmosphere at 600° C. for 6 hours. The pore volume of the HZSM-5 zeolite support according to Comparative Example 1 was 0.35 $cm^3/g$.

Comparative Example 2

Catalyst (HZSM-5, Si/Al=15)

In order to convert ammonium ($NH_4$)-type zeolite (Zeolyst; CBV3024E, Si/Al=15) into hydrogen (H)-type ZSM-5, the zeolite was calcined in an air atmosphere at 600° C. for 6 hours.

Example 1

Impregnation Method—Catalyst ($Gd_{WI}$/HZSM-5, Si/Al=25)

An appropriate amount of gadolinium nitrate hexahydrate ($(GdNO_3)_3 \cdot 6H_2O$), which satisfies the mass of gadolinium (0.05 g) per 1 g of the HZSM-5 zeolite support of Comparative Example 1, was dissolved in 0.4 mL of deionized water per 1 g of HZSM-5. The support was mixed with the aqueous solution of the precursor, and then the mixture was evenly stirred so that the prepared gadolinium precursor can be supported on the HZSM-5 zeolite support by the incipient wetness impregnation method. The obtained gadolinium-HZSM-5 ($Gd_{WI}$/HZSM-5) catalyst was dried in an air atmosphere at 110° C. for 12 hours, and then calcined in an air atmosphere at 550° C. for 5 hours.

Figure 1:
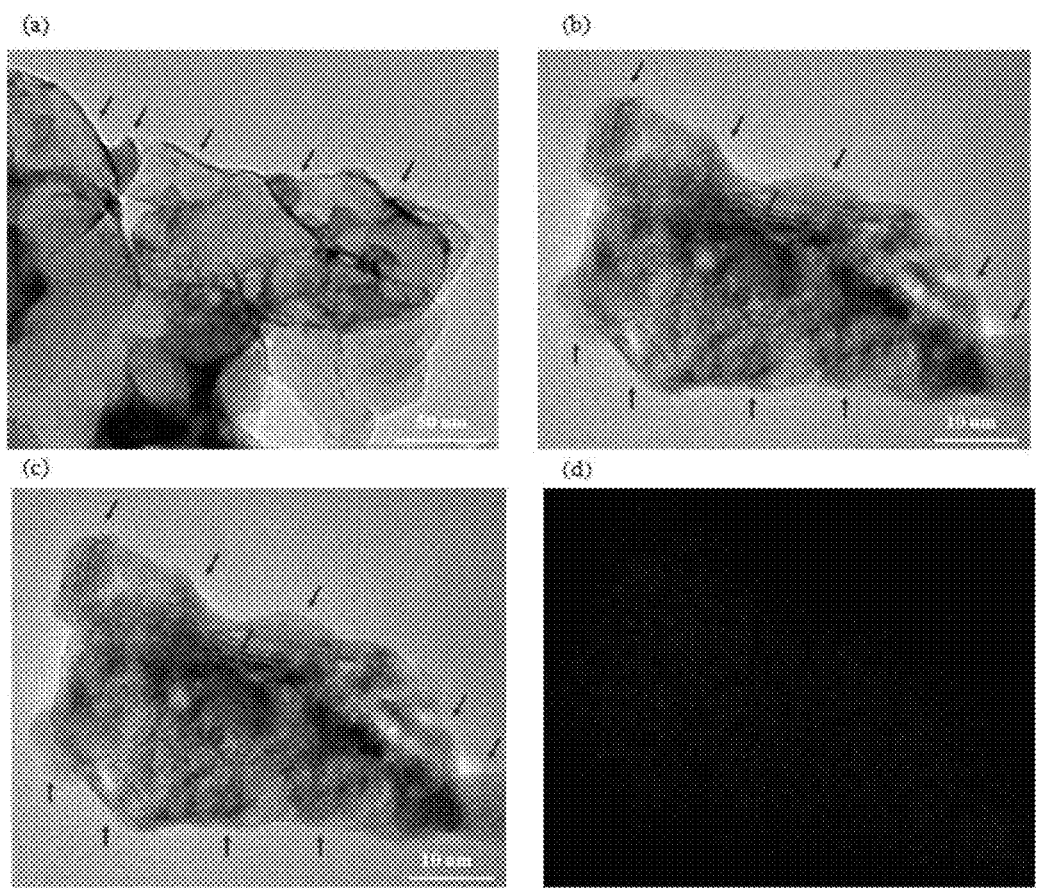
FIG. 1 is scanning transmission electron microscope (STEM) images showing the distribution of gadolinium in the catalyst prepared in Example 1.

FIG. 1 shows STEM images of the catalyst ($Gd_{WI}$/HZSM-5, Si/Al=25) of Example 1. As a result of the STEM analysis, it was observed that the HZSM-5 crystals were covered by a thin film having a thickness of 1 nm to 3 nm. It was confirmed that this thin film showed a clear lattice exhibited only in metals or metal oxides, and as a result of EDS mapping, the gadolinium ingredients were evenly distributed on the entire surface of HZSM-5.

Figure 2:
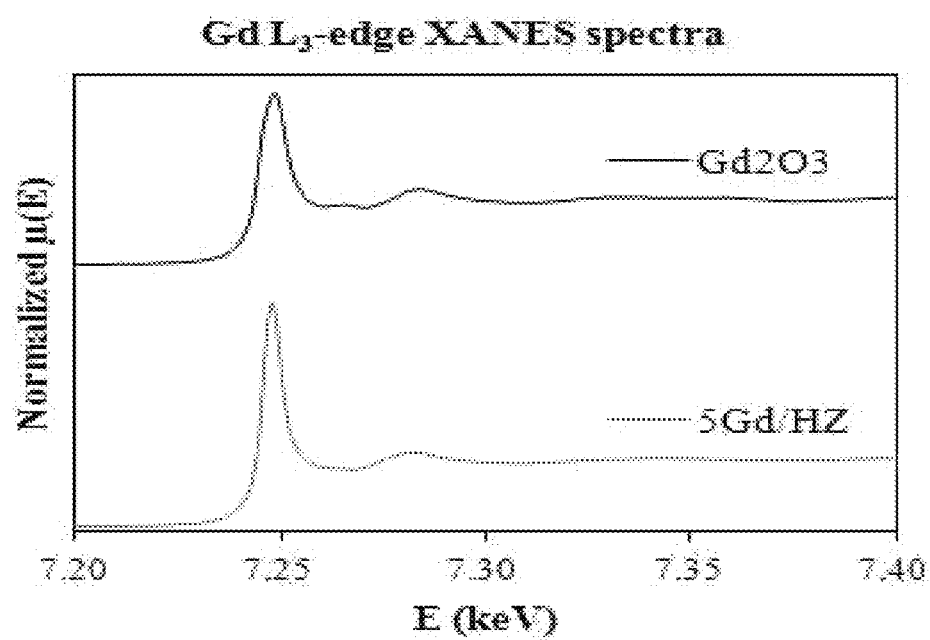
FIG. 2 is a graph showing the oxidation state of gadolinium in the catalyst prepared in Example 1 using the analysis of X-ray adsorption spectroscopy.

The oxidation state of gadolinium was analyzed in the catalyst synthesized by the method of Example 1 using an analysis of X-ray adsorption spectroscopy (FIG. 2). FIG. 2 is a graph showing the oxidation state of gadolinium in the catalyst synthesized by the method of Example 1 using an analysis of X-ray adsorption spectroscopy. The X-ray absorption near edge spectra (XANES) of gadolinium oxide ($Gd_2O_3$) as reference sample and 5Gd/HZSM-5 (Example 1) were exactly expressed at 7.25 keV, and the two spectra showed shapes that are almost identical to each other. As a result, it can be seen that the gadolinium supported on HZSM-5 exists in the oxidation state which is identical to that of $Gd_2O_3$, the reference sample. Therefore, a nano-sized film of gadolinium oxide is formed on the HZSM-5 support during synthesis of the catalyst, and this film physically hinders the adsorption of the coke precursors formed during the conversion reaction of hydrocarbons, resulting in the reduction of coke formation.

Example 2

Ion-Exchange Method—Catalyst ($Gd_{IE}$/HZSM-5, Si/Al=15)

50 mL of a 0.5 M aqueous solution of the gadolinium precursor per 1 g of the HZSM-5 support of Comparative Example 2 was prepared, and gadolinium nitrate hexahydrate (($GdNO_3)_3 \cdot 6H_2O$) was used as the gadolinium precursor. The HZSM-5 zeolite support was mixed in the aqueous solution of the gadolinium precursor, and the solid acid slurry was stirred at 60° C. for 3 hours for ion exchange. The solid acid slurry obtained by repeating the above procedure three times was centrifuged to separate only a solid acid catalyst, and the obtained solid acid catalyst was washed using deionized water and then again separated by centrifugation. The solid acid catalyst ($Gd_{IE}$/HZSM-5, Si/Al=15) obtained by repeating the above washing procedure three times was dried and calcined by the method described in Example 1.

Example 3

Impregnation Method—Catalyst ($Gd_{WI}$/HZSM-5, Si/Al=15)

A catalyst was prepared in the same manner as in Example 1, except that the HZSM-5 (Si/Al=15) zeolite of Comparative Example 2 was used as a support.

Example 4

Impregnation Method—Catalyst (Ga—$Gd_{WI}$/HZSM-5, Si/Al=15)

Gallium (Ga) metal was further supported on the $Gd_{WI}$/HZSM-5 catalyst of Example 3.

An appropriate amount of gallium nitrate hexahydrate (($GaNO_3)_3 \cdot xH_2O$), which satisfies the mass of gallium (0.03 g) per the $Gd_{WI}$/HZSM-5 support (1 g) of Example 3, was dissolved in 0.4 mL of deionized water per 1 g of $Gd_{WI}$/HZSM-5. The support, $Gd_{WI}$/HZSM-5, was mixed with the aqueous solution of the gallium precursor, and then the mixture was evenly stirred so that the prepared gallium precursor can be supported on $Gd_{WI}$/HZSM-5 by the incipient wetness impregnation method. The obtained gallium-gadolinium-HZSM-5 (Ga—$Gd_{WI}$/HZSM-5) catalyst was dried in an air atmosphere at 110° C. for 12 hours, and then calcined in an air atmosphere at 550° C. for 5 hours.

Comparative Example 3

Catalyst ($Ga_{WI}$/HZSM-5, Si/Al=15)

Gallium was supported on the HZSM-5 support of Comparative Example 2 according to the impregnation method according to Example 4.

Example 5

Impregnation Method—Catalyst ($Gd_{WI}$/zeolite Y, Si/Al=40)

A catalyst was prepared in the same manner as in Example 1, except that hydrogen (H)-type zeolite Y (Zeolyst; CBV720, Si/Al=40) was used as a solid acid support.

Comparative Example 4

Catalyst ($Gd_{WT}$/zeolite Y, Si/Al=40)

The hydrogen (H)-type zeolite Y (Zeolyst; CBV720, Si/Al=40) used in Example 5 was prepared as a solid acid catalyst.

Table 1 shows conditions of the catalyst synthesis of each Example and Comparative Example.

5, 6, 7, 8, 9, and 10, was prepared using hydrochloric acid (HCl) and an ammonia solution ($NH_4OH$; 35%). The HZSM-5 catalyst was mixed with the aqueous solution of the precursor at room temperature for 1 hour, and then the aqueous solution and catalyst were separated by a centrifuge. The catalyst was washed with deionized water, and then once more centrifuged for separation. The solid acid catalyst ($Gd_{EA}$/HZSM-5, Si/Al=15) obtained by repeating

TABLE 1

| Example | Name | Support | Gd Precursor | Metal | Supporting Method |
|---|---|---|---|---|---|
| Example 1 | $Gd_{WT}$/HZSM-5, Si/Al = 25 | HZSM-5, Si/Al = 25 (Comparative Example 1) | the gadolinium nitrate hexahydrate $(GdNO_3)_3 \cdot 6H_2O$, in an appropriate amount, which satisfies the mass of gadolinium (0.05 g) per support (1 g) | — | Impregnation method |
| Example 2 | $Gd_{IE}$/HZSM-5, Si/Al = 15 | HZSM-5, Si/Al = 15 (Comparative Example 2) | $(GdNO_3)_3 \cdot 6H_2O$, 50 mL of a 0.5M aqueous solution of the gadolinium precursor per 1 g of HZSM-5 | — | Ion-exchange method |
| Example 3 | $Gd_{WT}$/HZSM-5, Si/Al = 15 | HZSM-5, Si/Al = 15 (Comparative Example 2) | $(GdNO_3)_3 \cdot 6H_2O$, in an appropriate amount, which satisfies the mass of gadolinium (0.05 g) per the support (1 g) | — | Impregnation method |
| Example 4 | $Gd_{WT}$/HZSM-5, Si/Al = 15 | HZSM-5, Si/Al = 15 (Comparative Example 2) | $(GdNO_3)_3 \cdot 6H_2O$, in an appropriate amount, which satisfies the mass of gadolinium (0.05 g) per the support (1 g) | Gallium (Ga) metal (0.03 g per 1 g of the support) | Impregnation method |
| Example 5 | $Gd_{WT}$/zeolite Y, Si/Al = 40 | zeolite Y, Si/Al = 40 | $(GdNO_3)_3 \cdot 6H_2O$, in an appropriate amount, which satisfies the mass of gadolinium (0.05 g) per the support (1 g) | — | Impregnation method |
| Comparative Example 1 | HZSM-5, Si/Al = 25 | HZSM-5, Si/Al = 25 | — | — | — |
| Comparative Example 2 | HZSM-5, Si/Al = 15 | HZSM-5, Si/Al = 15 | — | — | — |
| Comparative Example 3 | $Gd_{WT}$/HZSM-5, Si/Al = 15 | HZSM-5, Si/Al = 15 | — | Gallium (Ga) metal (0.03 g per 1 g of the support) | Impregnation method |
| Comparative Example 4 | $Gd_{WT}$/zeolite Y, Si/Al = 40 | zeolite Y, Si/Al = 40 | — | — | — |

Example 6

Electrostatic Adsorption Method—Catalyst ($Gd_{EA}$-HZSM-5)

Gadolinium was supported by an electrostatic adsorption method using HZSM-5 (CBV3024E) as a solid acid support. The pH of an aqueous solution of the gadolinium precursor was adjusted according to the point of zero charge of a solid acid material and the charge of the gadolinium precursor. Gadolinium(III) nitrate hexahydrate ($Gd(NO_3)_3 6H_2O$; MW: 451.36) was used as the gadolinium precursor. A 0.05 M aqueous solution of the precursor was prepared, and then the aqueous solution of the precursor, the pH of which was 1, 3, 5, 6, 7, 8, 9, and 10, was prepared using hydrochloric acid (HCl) and an ammonia solution ($NH_4OH$; 35%). The HZSM-5 catalyst was mixed with the aqueous solution of the precursor at room temperature for 1 hour, and then the aqueous solution and catalyst were separated by a centrifuge. The catalyst was washed with deionized water, and then once more centrifuged for separation. The solid acid catalyst ($Gd_{EA}$/HZSM-5, Si/Al=15) obtained by repeating the above washing procedure three times was dried and calcined by the method described in Example 1.

Examples 7 to 9

Catalysts According to Gadolinium Content

Catalysts were prepared in the same manner as in Example 1, except that a weight ratio of the gadolinium content in the catalyst relative to the catalyst was 1, 5, and 10, respectively.

The synthesis conditions of Examples 7 to 9 are shown in Table 2 below.

TABLE 2

| Example | Name | Support | Gd Precursor | Supporting Metal | Method |
|---|---|---|---|---|---|
| Example 1 | $Gd_{WT}$/HZSM-5, Si/Al = 25 | HZSM-5, Si/Al = 25 (Comparative Example 1) | gadolinium nitrate hexahydrate $((GdNO_3)_3 \cdot 6H_2O)$, in an appropriate amount, which satisfies the mass of gadolinium (0.05 g) per the support (1 g) | — | Impregnation method |
| Example 7 | $Gd_{WT}$/HZSM-5, Si/Al = 25 | HZSM-5, Si/Al = 25 (Comparative Example 1) | Gadolinium nitrate hexahydrate $((GdNO_3)_3 \cdot 6H_2O)$ the weight ratio 1 relative to catalyst | — | Impregnation method |
| Example 8 | $Gd_{WT}$/HZSM-5, Si/Al = 25 | HZSM-5, Si/Al = 25 (Comparative Example 1) | Gadolinium nitrate hexahydrate $((GdNO_3)_3 \cdot 6H_2O)$ the weight ratio 5 relative to catalyst | — | Impregnation method |
| Example 9 | $Gd_{WT}$/HZSM-5, Si/Al = 25 | HZSM-5, Si/Al = 25 (Comparative Example 1) | Gadolinium nitrate hexahydrate $((GdNO_3)_3 \cdot 6H_2O)$ the weight ratio 10 relative to catalyst | — | Impregnation method |

Experimental Example 1

Reactivity and Coke formation Rate of Catalyst of Example 1 comparative Example 1 in Ethylene Oligomerization The reactivity and coke formation rate of the solid acid catalysts of Example 1 ($Gd_{WT}$/HZSM-5) and Comparative Example 1 (HZSM-5) in the oligomerization of ethylene were compared. In the center of a ½-inch stainless steel fixed bed reactor, the catalyst (2 g) and silicon carbide (SiC) as a diluent were charged, and then catalyst activation was carried out at 300° C. for 1 hour while supplying helium (He) at 100 mL/min. For the oligomerization of ethylene, a feed gas ($C_2H_4$ 74%+Ar 26%) satisfying a weight hourly space velocity of 419.6 $h^{-1}$ was supplied at a reaction pressure of 20 bar and reaction temperature of 350° C. The composition of each product was analyzed using on-line gas chromatography (GC-TCD&FID) and GC-FID.

The amount of coke deposited on the surface of the catalyst was analyzed by thermogravimetric analysis to compare the rate of coke formation against reaction time. During the oligomerization of ethylene for 15 hours, the conversion rate of ethylene for both catalysts was 97% or more, and the selectivity of the light hydrocarbons ($C_1$ to $C_5$) and the heavy hydrocarbons ($C_6$ or more) was 47% and 53% in Example 1, and 44% and 56% in Comparative Example 1, respectively. The coke formation rate in each catalyst was 0.157 mg/h in Example 1 and 0.178 mg/h in Comparative Example 1; that is, the coke formation rate in Example 1 was decreased by 11.8% compared to that of Comparative Example 1. Table 3 shows the reactivity and coke formation rate of the catalysts in Example 1 and Comparative Example 1.

TABLE 3

| Example | Name | Ethylene Conversion Rate | Light Hydrocarbon ($C_1$ to $C_5$) Selectivity | Heavy Hydrocarbon ($C_6$ or more) Selectivity | Coke Formation Rate | Note |
|---|---|---|---|---|---|---|
| Example 1 | $Gd_{WT}$/HZSM-5, Si/Al = 25 | 97% or higher | 47% | 53% | 0.157 mg/h | Coke formation rate decreased by 11.8% compared to Comparative Example 1 |
| Comparative Example 1 | HZSM-5, Si/Al = 25 | 97% or higher | 44% | 56% | 0.178 mg/h | |

Experimental Example 2

Analysis of Catalyst According to Gadolinium Content

The acidity and basicity of the catalysts, adjusted to have weight ratio of the gadolinium content in the catalysts relative to the catalysts as 1, 5, and 10 according to Examples 7 to 9, were analyzed using the temperature-programmed desorption of ammonia ($NH_3$-TPD) and the temperature-programmed desorption of carbon dioxide ($CO_2$-TPD).

Figure 3:
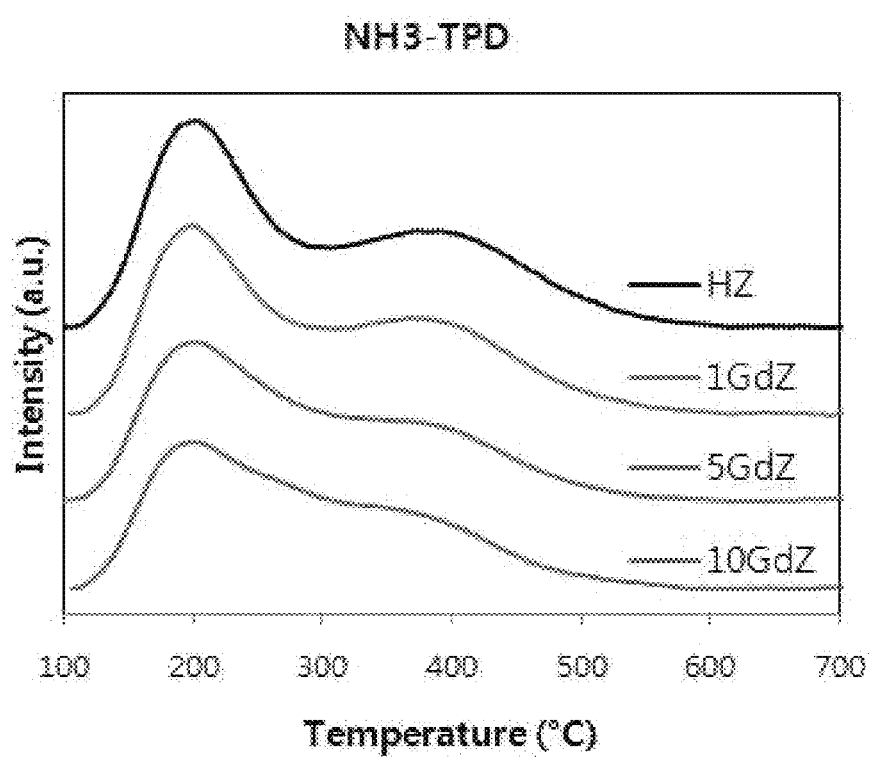
FIG. 3 is a graph showing the temperature-programmed desorption curve of ammonia per gadolinium content in the catalyst, in which coke formation is inhibited, prepared in Examples 7 to 9.
Figure 4:
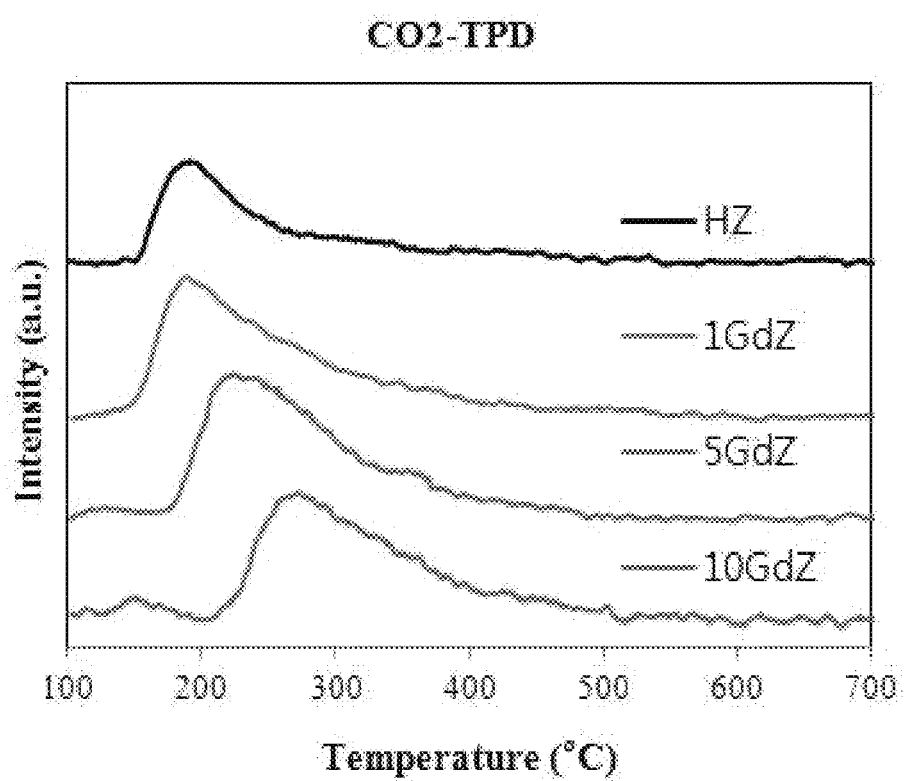
FIG. 4 is a graph showing the temperature-programmed desorption curve of carbon dioxide per gadolinium content in the catalyst, in which coke formation is inhibited, prepared in Examples 7 to 9.

FIG. 3 and Table 4 show the temperature-programmed desorption curve of ammonia and the amount of acid sites quantified per gadolinium content; and FIG. 4 and Table 5 show the temperature-programmed desorption curve of carbon dioxide and the amount of base sites quantified per gadolinium content.

It was observed that the change in the acid strength was insignificant because although weak acid sites were increased and strong acid sites were decreased as the gadolinium content increased, there was no positional shift of the curve. On the contrary, the base strength became stronger (the temperature at which desorption of carbon dioxide is maximum is increased) and the amount of the base sites were increased as the gadolinium content of the catalyst increased.

Since the coke intermediates, such as olefins or aromatic carbons which have a potential to grow as coke by adsorbing to the catalyst surface and which are formed during the reaction, have a basicity that shares electron pairs, the adsorption of the coke intermediates tends to be inhibited on the surface of the HZSM-5 catalyst in which the basicity is increased due to the presence of gadolinium. Therefore, the adsorption of the coke intermediates, which were formed during the conversion reaction of hydrocarbons, to the surface of the zeolite catalyst is not only physically hindered by the film of gadolinium oxide with a nano-size thickness, but also chemically reduced by the acid-base properties of the zeolite surface modified by gadolinium, and as a result, the zeolite catalyst on which gadolinium is supported reduces the inactivation caused by coking.

Tables 4 and 5 show the acid sites and base sites according to the gadolinium content, respectively.

TABLE 4

Acid sites quantified by the $NH_3$-temperature-programmed desorption ($NH_3$-TPD) per gadolinium content

| Example | Catalyst | Weak acid site (μmol/g) | Strong acid site (μmol/g) | Total (μmol/g) |
|---|---|---|---|---|
| Comparative Example 1 | HZ | 702 | 606 | 1308 |
| Example 7 | 1 GdZ | 692 | 569 | 1261 |
| Example 8 | 5 GdZ | 754 | 345 | 1099 |
| Example 9 | 10 GdZ | 871 | 267 | 1138 |

TABLE 5

Base sites quantified by the $CO_2$-temperature-programmed desorption ($CO_2$-TPD) per gadolinium content

| Example | Catalyst | Temperature (° C.) | Total base site (μmol/g) |
|---|---|---|---|
| Comparative Example 1 | HZ | 187 | 146.5 |
| Example 7 | 1 GdZ | 191 | 197.6 |
| Example 8 | 5 GdZ | 259 | 257.2 |
| Example 9 | 10 GdZ | 287 | 281.3 |

The result of the $CO_2$-temperature programmed desorption ($CO_2$-TPD) shows that the $CO_2$ desorption in Comparative Example 1 (Base ZSM-5) started at 150° C. and became maximum at 187° C. (FIG. 4 and Table 5). Meanwhile, as the content of gadolinium increased, the temperature at which the $CO_2$ desorption began and the temperature at which the desorption became maximum were gradually increased, and thus the $CO_2$ desorption of the catalyst (10GdZ; Example 9), in which 10 wt % gadolinium was impregnated, became maximum at 287° C. Additionally, as the content of gadolinium increased, the number of base sites also increased. Accordingly, it can be seen that the base strength and the density of the base sites on the surface of the zeolite catalyst became stronger and increased as the content of gadolinium increased.

Olefins or aromatic carbons formed during the conversion of hydrocarbons inherently have weak Lewis bases. These products are strongly adsorbed to the acid sites of zeolite, which is a solid acid catalyst, cyclized, and then dehydrogenated, thereby growing into coke comprising of a complex aromatic structure. In the case of the zeolite catalyst on which gadolinium is supported, the chemical adsorption of olefins or aromatic carbons must be hindered due to the increased basicity, and as a result, the coke formation is also reduced.

Experimental Example 3

Conversion of Methanol to Aromatic Compound Using $Gd_{WT}$-HZSM-5 Catalyst

In the process of converting methanol to a monocyclic aromatic compound (MTA), the reactivity and the amount coke formed on the surface of the HZSM-5 zeolite catalysts on which gadolinium was supported by the impregnation method according to Example 1 were compared. The reaction was carried out in a 0.5-inch fixed bed reactor. The powder catalysts (1 g) were placed in the center of the reactor tube, and the other parts were filled with quartz wool and SiC. The catalysts before the reaction were pretreated in a helium atmosphere at 400° C. for 1 hour. Thereafter, pure methanol (0.2 mL/min) was flowed together with 50 sccm helium at 400° C. in the MTA reaction. The reaction was carried out for 24 hours, and then the conversion rate of methanol and the selectivity of the monocyclic aromatic compound when using Comparative Example 1 (HZSM-5) and Example 1 ($5Gd_{WT}$-HZSM-5) were analyzed over time, and the results therefrom are summarized in Table 6.

Both catalysts showed a 99% conversion rate of methanol until 14 hours of the reaction, but the catalysts showed a tendency that such conversion rate was gradually decreased after 12 hours. In the case of Comparative Example 1, the rapid decrease in the conversion rate occurred, and thus the conversion rate decreased to 30% or below after 24 hours of the reaction; whereas in the case of Example 1, although the decrease in the conversion rate of methanol occurred, 78% of the conversion rate of methanol was maintained even after 24 hours of the reaction. In the case of Comparative Example 1, the selectivity of the $C_6$ to $C_9$ aromatics also showed a value close to 0% after 24 hours of the reaction. However, in the case of Example 1, 57.5% of the selectivity was maintained. As a result of analyzing the amount of carbon deposition of the catalysts after the reaction by using an elemental analyzer, it was shown that 23 wt % of carbon was deposited in the catalyst of the Comparative Example 1, and that 17 wt % of carbon was deposited in the catalyst of Example 1. Therefore, the catalyst on which gadolinium is supported showed an improved lifespan in the conversion of methanol to an aromatic compound, and also showed that the coke deposition was reduced by 26%.

TABLE 6

| | Comparative Example 1 (HZSM-5) | | Example 1 ($Gd_{WT}$-HZSM-5) | |
|---|---|---|---|---|
| Reaction time | Conversion rate (%) | Selectivity ($C_6$ to $C_9$ Aromatics; %) | Conversion rate (%) | Selectivity ($C_6$ to $C_9$ Aromatics; %) |
| 2 | 100.0 | 82.5 | 100.0 | 82.1 |
| 4 | 100.0 | 76.0 | 100.0 | 72.2 |
| 6 | 100.0 | 73.5 | 100.0 | 64.2 |
| 8 | 100.0 | 76.3 | 100.0 | 68.2 |
| 10 | 100.0 | 69.9 | 100.0 | 67.3 |

TABLE 6-continued

| | Comparative Example 1 (HZSM-5) | | Example 1 (Gd$_{WT}$-HZSM-5) | |
|---|---|---|---|---|
| Reaction time | Conversion rate (%) | Selectivity (C$_6$ to C$_9$ Aromatics; %) | Conversion rate (%) | Selectivity (C$_6$ to C$_9$ Aromatics; %) |
| 12 | 99.1 | 71.8 | 98.2 | 55.1 |
| 14 | 92.5 | 66.5 | 96.1 | 61.2 |
| 16 | 83.7 | 65.8 | 94.1 | 62.7 |
| 18 | 62.5 | 58.7 | 90.5 | 60.5 |
| 20 | 55.1 | 22.9 | 84.6 | 58.8 |
| 22 | 22.9 | 11.8 | 90.4 | 58.7 |
| 24 | 28.3 | 4.5 | 78.1 | 57.5 |

Experimental Example 4

Reactivity and Coke Formation Rate of Catalyst in Process of Synthesizing Monocyclic Aromatic Compound and Long-Chain Olefin Compound from Syngas In the process of synthesizing a monocyclic aromatic compound and a long-chain olefin compound from syngas, the reactivity and the amount of coke formed on the surface of the HZSM-5 zeolite catalysts on which gadolinium was supported were compared.

First, an iron-based catalyst (1 g) having a composition ratio of 100Fe-6Cu-16Al-4K was charged into a ½-inch stainless steel fixed bed reactor. The syngas, the composition ratio of which is $CO_2/(CO+CO_2)=0.5$ and $H_2/(2CO+3CO_2)=1$, was supplied at a flow rate of 1,800 mL/g-cat·h, and the Fischer-Tropsch synthesis was carried out at a reaction temperature of 320° C. and a reaction pressure of 20 bar. Meanwhile, a dehydrogenation process was carried out using the hydrocarbons prepared by the Fischer-Tropsch synthesis. Before performing the dehydrogenation of the prepared hydrocarbons, the C$_1$ to C$_{15}$ short-chain hydrocarbons were separated through a distillation process and used. In particular, the distillation apparatus maintained an internal temperature of 136° C. and an internal pressure of 20 bar.

In order to carry out the dehydrogenation process, the solid acid catalysts (0.6 g) of each of Examples and Comparative Examples were charged into a ½-inch stainless steel fixed bed reactor, and the reaction was carried out at a reaction temperature of 300° C. and a reaction pressure of 10 bar, and thus a monocyclic aromatic compound and a long-chain olefin compound were prepared. The composition of each product was analyzed using on-line gas chromatography (GC-TCD&FID) and GC/MS.

The structure of the reaction apparatus above is further described in detail in Korean Patent Application No. 10-2015-0002900.

Table 7 shows the results of analyzing the composition difference in the products and the production amount of the coke deposited on the catalyst surface by using a thermogravimetric analysis method when the catalysts of Examples 2 to 4 and Comparative Examples 2 and 3 were used in the process of synthesizing the monocyclic aromatic compound and long-chain olefin compound from the syngas.

TABLE 7

| Example | Product distribution (mol %) | | | Amount of Coke Produced (wt %) | Note |
|---|---|---|---|---|---|
| | BETX | Paraffin | Olefin | | |
| Example 2 | 34 | 39 | 12 | 4.2 | The amount of coke produced was reduced by 18% compared to Comparative Example 2 |
| Example 3 | 37 | 41 | 7 | 3.1 | The amount of coke produced was reduced by 39% compared to Comparative Example 2 |
| Example 4 | 50 | 31 | 9 | 3.3 | The amount of coke produced was reduced by 40% compared to Comparative Example 2 |
| Comparative Example 2 | 41 | 37 | 6 | 5.1 | |
| Comparative Example 3 | 53 | 28 | 6 | 5.5 | |

According to Table 7, in the case of the HZSM-5 catalysts (Examples 2 and 3) on which gadolinium is supported, there was no significant change in the product distribution, but the amount of the coke formed on the catalyst surface after the reaction at the equivalent reaction time was each reduced by 18% and 39% compared to that of the pure HZSM-5 catalyst (Comparative Example 2) on which gadolinium is not supported. Additionally, in the case of the HZSM-5 catalyst (Example 4) on which gadolinium and gallium are supported, it was observed that there was also no significant change in the product distribution, but the amount of the coke formed on the catalyst surface after the reaction at the equivalent reaction time was reduced by 40% compared to that of the HZSM-5 catalyst (Comparative Example 3) on which gallium is solely supported.

Experimental Example 5

Property Analysis of ZSM-5 Catalyst on which Gadolinium is Supported Using Ion-exchange Method The HZSM-5 catalyst on which gadolinium is supported using the ion-exchange method according to Example 2 was only ion-exchanged to the acid sites of $Gd^{3+}$, and thus the film of gadolinium oxide with a nano-size thickness could not be observed.

FIG. 5 is a graph showing the temperature-programmed desorption curve of ammonia of the anti-coking catalyst prepared by the ion-exchange and impregnation methods.

FIG. 6 is a graph showing the temperature-programmed desorption curve of carbon dioxide of the anti-coking catalyst prepared by the ion-exchange and impregnation methods.

Tables 8 and 9 each show the acid sites quantified by the temperature-programmed desorption of ammonia and the base sites quantified by the temperature-programmed desorption of carbon dioxide according to ion-exchange and impregnation methods.

As shown in FIGS. 5 and 6 and Tables 8 and 9, the catalysts synthesized by the ion-exchange method also showed a decrease in the acid sites and an increase in the base sites. It was found that range of the decrease in the acid sites was large while that of the increase in the base sites was small compared to those of the catalysts synthesized so that the equivalent amount of gadolinium was supported using the impregnation method (Example 1). Therefore, since a physical adsorption-hindering factor is not developed in the catalysts synthesized by the ion-exchange method, it can be considered that reduction of the inactivation of the catalysts is less than that of the catalysts synthesized by the impregnation method.

TABLE 8

Acid Sites Quantified by Temperature-programmed Desorption of Ammonia (Comparison between Ion-exchange Method and Impregnation Method)

| Example | Samples | Weak acid (µmol/g) | Strong acid (µmol/g) | Total acid (µmol/g) |
|---|---|---|---|---|
| Comparative Example 1 | HZSM-5 | 702 | 606 | 1308 |
| Example 1 | Impregnation method | 692 | 569 | 1261 |
| Example 2 | Ion-exchange method | 497 | 472 | 969 |

TABLE 9

Base Sites Quantified by Temperature-programmed Desorption of Carbon Dioxide (Comparison between Ion-exchange Method and Impregnation Method)

| Example | Samples | Temperature (° C.) | Total base (µmol/g) |
|---|---|---|---|
| Comparative Example 1 | HZSM-5 | 187 | 146.5 |
| Example 1 | Impregnation method | 191 | 197.6 |
| Example 2 | Ion-exchange method | 177 | 170.2 |

Experimental Example 6

Analysis of Catalyst Prepared Using HZSM-5(CBV3024E) and Electrostatic Adsorption Method FIG. 7 is high angle annular dark-field (HAADF) STEM images of the anti-coking catalys prepared by adsorbing gadolinium using electrostatic adsorption and HZSM-5 (CBV3024E) as a support according to Example 6. In the HAADF mode, a substance or atom with a high atomic number exhibits a bright color. It was confirmed in the images of FIG. 7 that thin films having a thickness of 1 nm to 3 nm covered the crystals. As a result of the energy dispersed X-ray analysis, high-density gadolinium atoms were detected in thin nano-size films having a bright color. High-density gadolinium atoms were detected in brightly colored areas inside the crystals, and further, the gadolinium atoms were also evenly detected in the other areas.

Accordingly, gadolinium not only always forms a film covering carriers at a certain amount or more regardless of synthesis methods, but also a considerable amount of gadolinium exists in the ion-exchanged state or in the monoatomic film in the zeolite pores or on the surface.

The invention claimed is:

1. A method of preparing a gadolinium (Gd)-containing anti-coking solid acid catalyst having a physical property of reducing coke formation, the method comprising:
    a first step of determining an amount of Gd or Gd-providing precursor to be used relative to the total weight of the solid acid catalyst that does not include Gd, wherein the determined amount of Gd reduces the coking of the solid acid catalyst below a specific level under a specific reaction condition in which the solid acid catalyst is intended to be used; and
    a second step of preparing the Gd-containing anti-coking solid acid catalyst using the amount determined in the first step, the second step comprising:
        obtaining an aqueous solution containing the Gd or the Gd-providing precursor;
        mixing the aqueous solution with a solid acid;
        drying the mixture to obtain a catalyst precursor material; and
        calcining the catalyst precursor material to obtain the Gd-containing anti-coking solid acid catalyst having the physical property of reducing coke formation.

2. The method according to claim 1, wherein the Gd-containing anti-coking solid acid catalyst prepared in the second step has an increased number of a base site by the presence of gadolinium when compared to the solid acid catalyst that does not include Gd.

3. The method according to claim 1, wherein the Gd-containing anti-coking solid acid catalyst prepared in the second step has a film containing Gd metal or gadolinium oxide formed on the surface of the solid acid catalyst with a nano-size thickness.

4. The method according to claim 1, wherein the amount of gadolinium to be used relative to the total weight of the solid acid catalyst is determined from the temperature-programmed desorption curve of carbon dioxide, base strength, or base site density per gadolinium content.

5. The method according to claim 1, further comprising a third step of determining the supported state of gadolinium in the solid acid catalyst prepared in the second step.

6. The method according to claim 1, wherein the specific reaction condition is a condition in which a reaction of forming coke intermediates exhibiting a basic property during the reaction occurs.

7. The method according to claim 6, wherein the reaction of forming coke intermediates having a basic property during the reaction is a hydrocarbon conversion reaction.

8. The method according to claim 1, wherein the specific reaction condition is a condition in which a reaction, selected from the group consisting of ethylene oligomerization reaction, methanol-to-gasoline reaction, hexane cracking reaction, and dehydrogenation reaction of a hydrocarbon formed by Fischer-Tropsch synthesis from syngas, in which the solid acid catalyst is intended to be used, occurs.

9. The method according to claim 1, wherein the Gd-containing anti-coking solid acid catalyst is a zeolite-based catalyst.

10. The method according to claim 1, wherein the Gd-providing precursor is at least one selected from the group consisting of gadolinium chloride ($GdCl_3$), gadolinium bromide ($GdBr_3$), gadolinium fluoride ($GdF_3$), gadolinium iodide ($GdI_3$), gadolinium chloride hexahydrate ($GdCl_3 \cdot 6H_2O$), gadolinium nitrate hexahydrate (($GdNO_3)_3 \cdot 6H_2O$), gadolinium chloride hydrate ($GdCl_3 \cdot xH_2O$), gadolinium acetate hydrate ($Gd(CH_3CO_2)_3 \cdot xH_2O$), gadolinium sulfate octahydrate ($Gd_2(SO_4)_3 \cdot 8H_2O$), gadolinium oxalate hydrate ($Gd_2(C_2O_4)_3 \cdot xH_2O$), gadolinium sulfate ($Gd_2(SO_4)_3$), gadolinium tris(isopropoxide) ($C_5H_{21}GdO_3$), gadolinium carbonate hydrate ($Gd_2(CO_3)_3 \cdot xH_2O$), gadolinium hydroxide hydrate ($Gd(OH)_3 \cdot xH_2O$), gadolinium boride ($GdB_6$), and a mixture thereof.

11. A method of preparing a hydrocarbon by performing ethylene oligomerization reaction, methanol-to-gasoline reaction, hexane cracking reaction, or dehydrogenation reaction of a hydrocarbon formed by Fischer-Tropsch synthesis from syngas, using the solid acid catalyst prepared by the method of claim 1, which comprises gadolinium on the surface, the method comprising:
contacting an ethylene containing feed stream with the solid acid catalyst under conditions sufficient to perform the ethylene oligomerization reaction,
contacting a methanol containing feed stream with the solid acid catalyst under conditions sufficient to perform the methanol-to-gasoline reaction,
contacting a hexane containing feed stream with the solid acid catalyst under conditions sufficient to perform the hexane cracking reaction, or
contacting a hydrocarbon formed by Fischer-Tropsch synthesis from syngase with the solid acid catalyst under conditions sufficient to perform the dehydrogenation reaction.

12. The method according to claim 11, wherein the solid acid catalyst has an increased number of a base site by the presence of gadolinium.

13. The method according to claim 11, wherein, for preventing the absorption of a coke intermediate physically, chemically by the acid-base characteristic of the catalyst surface, or both physically and chemically, a nano-sized gadolinium or gadolinium oxide-containing film is formed on the surface of the solid acid catalyst, or $Gd^{3+}$ is ion-exchanged to an acid site of the solid acid catalyst, or supported by an electrostatic adsorption method.

14. The method according to claim 11, wherein the Gd-containing solid acid catalyst further comprises a transition metal, a post-transition metal, and a rare-earth metal.

15. The method according to claim 11, wherein the Gd-containing solid acid catalyst is prepared by an impregnation method, an ion-exchange method, or an electrostatic adsorption method.

16. The method according to claim 11, wherein a film containing Gd metal or gadolinium oxide is formed on the surface of the solid acid catalyst with a nano-size thickness.

17. An anti-coking catalyst having a physical property of reducing coke formation, which is a Gd-containing solid acid catalyst wherein a film comprising Gd metal or gadolinium oxide is present on the surface of the solid acid catalyst with a nano-size thickness.

18. The anti-coking catalyst of claim 17, which is prepared by a method comprising:
a first step of determining an amount of gadolinium (Gd) or Gd-providing precursor to be used relative to the total weight of the solid acid catalyst that does not include Gd, wherein the determined amount of Gd reduces the coking of the solid acid catalyst below a specific level under a specific reaction condition in which the solid acid catalyst is intended to be used; and
a second step of preparing a Gd-containing solid acid catalyst using the amount determined in the first step, the second step comprising:
obtaining an aqueous solution containing the Gd or the Gd-providing precursor;
mixing the aqueous solution with a solid acid;
drying the mixture to obtain a catalyst precursor material; and
calcining the catalyst precursor material to obtain the Gd-containing solid acid catalyst having the physical property of reducing coke formation.

19. A method of preparing a hydrocarbon by performing ethylene oligomerization reaction, methanol-to-gasoline reaction, hexane cracking reaction, or dehydrogenation reaction of a hydrocarbon formed by Fischer-Tropsch synthesis from syngas, using the anti-coking catalyst of claim 17, the method comprising:
contacting an ethylene containing feed stream with the anti-coking catalyst of claim 17 under conditions sufficient to perform the ethylene oligomerization reaction,
contacting a methanol containing feed stream with the anti-coking catalyst of claim 17 under conditions sufficient to perform the methanol-to-gasoline reaction,
contacting a hexane containing feed stream with the anti-coking catalyst of claim 17 under conditions sufficient to perform the hexane cracking reaction, or
contacting a hydrocarbon formed by Fischer-Tropsch synthesis from syngas with the anti-coking catalyst of claim 17 under conditions sufficient to perform the dehydrogenation reaction.

* * * * *